(12) United States Patent
Priepke

(10) Patent No.: US 7,757,469 B2
(45) Date of Patent: Jul. 20, 2010

(54) CAROUSEL MERGER

(75) Inventor: Edward H. Priepke, Lancaster, PA (US)

(73) Assignee: CNH America LLC, New Holland, PA (US)

( * ) Notice: Subject to any disclaimer, the term of this patent is extended or adjusted under 35 U.S.C. 154(b) by 162 days.

(21) Appl. No.: 12/195,705

(22) Filed: Aug. 21, 2008

(65) Prior Publication Data

US 2010/0048270 A1 Feb. 25, 2010

(51) Int. Cl.
*A01D 57/00* (2006.01)

(52) U.S. Cl. ........................................................ 56/192

(58) Field of Classification Search ................... 56/192, 56/366, 376, 377, 320.2; 460/111
See application file for complete search history.

(56) References Cited

U.S. PATENT DOCUMENTS

| | | | |
|---|---|---|---|
| 3,115,741 A * | 12/1963 | Robinson | 56/503 |
| 3,608,290 A * | 9/1971 | Robinson | 56/192 |
| 3,754,384 A | 8/1973 | Case et al. | |
| 3,772,865 A | 11/1973 | Ruprecht et al. | |
| 3,916,606 A * | 11/1975 | Brudnak et al. | 56/13.4 |
| 4,700,535 A | 10/1987 | Wessel | |
| 4,702,062 A | 10/1987 | Phelan | |
| 4,757,672 A | 7/1988 | Roger | |
| 5,005,344 A * | 4/1991 | McCracken | 56/14.7 |
| 5,163,277 A | 11/1992 | Fransgaard | |
| 5,215,500 A | 6/1993 | Kirby | |
| 5,251,431 A | 10/1993 | Shoop | |
| 6,212,865 B1 | 4/2001 | Peeters et al. | |
| 6,308,503 B1 * | 10/2001 | Scag et al. | 56/6 |
| 6,406,368 B1 | 6/2002 | Cruson et al. | |
| 6,715,274 B2 | 4/2004 | Peeters et al. | |
| 6,881,145 B2 | 4/2005 | Holmen | |
| 7,028,459 B2 | 4/2006 | Lohrentz et al. | |

FOREIGN PATENT DOCUMENTS

| EP | 0 084 872 A1 | 8/1983 |
|---|---|---|
| EP | 0439991 A1 | 12/1990 |

* cited by examiner

*Primary Examiner*—Alicia M Torres
(74) *Attorney, Agent, or Firm*—John William Stader; Michael G. Harms; Patrick M. Sheldrake

(57) ABSTRACT

A carousel merger is provided that is designed to replace existing belt conveyor devices. The carousel merger device has a crop receiving passageway which extends through a top surface of the carousel merger device toward a bottom surface of the carousel merger device. The crop receiving passageway has a plurality of crop receiving regions and a crop flow region. The crop receiving regions have arcuate sidewalls, support plates rotatably mounted to the bottom surface and blades mounted to the support plates. The crop flow region is provided adjacent the crop receiving regions with a portion of the crop flow region extending through the crop receiving regions. The crop flow region has a back wall opposite from the arcuate sidewalls of the crop receiving regions. A discharge is in communication with the crop flow region.

9 Claims, 5 Drawing Sheets

CAROUSEL MERGER

FIELD OF THE INVENTION

The invention is directed to a device for moving crops for use with harvesting equipment. In particular, the invention is directed to a simple and robust mechanism for replacing the conveyor belt mechanism currently used for many applications.

BACKGROUND OF THE INVENTION

Windrowing agricultural cuttings is a well-known practice. As harvesting equipment capacities continue to increase, it is a substantial underutilization of the harvest equipment to gather a plurality of single windrows. Therefore, the merging of two, three or more windrows must occur for proper utilization of the equipment.

Windrow merger devices can be used and incorporated into various agricultural equipment, including, but not limited to, forage mowers, mower conditioners and windrowers. The windrow merger devices are positioned to move the crop after other operations such as mowing, conditioning, raking, etc. have been performed on the crop. These merger devices can move the crop to either side of the agricultural equipment.

An example of a windrow merger device is shown in U.S. Pat. No. 6,568,163. As is shown and described in the patent, the windrow merger device is a conveyor belt which can be disposed at a 45 degree angle to the horizontal so as to be in the path of the cut crop discharged by the conditioner, the conveyor having a lateral extent such as to deposit the crop in a windrow located outside a selected one of the front pair of support wheels. Numerous other types of agricultural equipment that have conveyor belts to move or merge the crops to form windrows are known in the industry, including U.S. Pat. Nos. 6,205,757 and 7,310,929.

While these belt or apron types of windrow mergers are commonly used in the industry, problems with these devices exist. Because of the continuous nature and length of the belts in conjunction with the amount and weight of the material moved by the belts, the belts may develop slack over time. Slack allows the belt to become slightly misaligned, causing the belt to improperly wear and causing the accelerated repair and replacement of the drives and motors required for operation of the belt. In addition, because of the open design of the conveyor belt, debris from the crops can collect under the belt, also adding to the maintenance of the equipment. It would therefore be beneficial to have a window merger that would be more robust and simpler to maintain.

SUMMARY OF THE INVENTION

The invention is directed to a carousel merger device used to merge crops. The carousel merger device is designed to replace existing belt conveyor merging devices and can be easily integrated into the design of agricultural equipment. The carousel merger device has a crop receiving passageway which extends through a top surface of the carousel merger device toward a bottom surface of the carousel merger device. The crop receiving passageway has a plurality of crop receiving regions and a crop flow region. The crop receiving regions have arcuate sidewalls, support plates rotatably mounted to the bottom surface and blades mounted to the support plates. The crop flow region is provided adjacent the crop receiving regions with a portion of the crop flow region extending through the crop receiving regions. The crop flow region has a back wall opposite from the arcuate sidewalls of the crop receiving regions. A discharge is provided in communication with the crop flow region.

In operation, as crops are moved into the crop receiving regions, the crops make contact with the support plates and blades which are rotating. This contact causes the crops to be moved by the support plates, blades and the centrifugal force generated thereby, toward the arcuate sidewalls. The continued movement of the crops causes the crops to move into and through the crop flow region to the discharge.

The carousel merger device may have an arcuate end wall provided in the crop flow region at an end of the crop flow region opposite the discharge. The arcuate end wall extends between a respective arcuate sidewall and the back wall, and has essentially the same radius as the respective arcuate sidewall. Slots may be provided on several respective arcuate sidewalls and the back wall. The slots are dimensioned to cooperate with the arcuate end wall to allow the arcuate end wall to be moved between positions. A second discharge may be provided at the end of the crop flow region opposite the first discharge. The direction of rotation of the securing plates and blades can be reversed to allow the crops to discharge from the opposite side of the carousel merger device depending on the positioning of the arcuate back wall.

Each of the crop receiving regions may have progressively larger diameters as the respective crop receiving regions are positioned nearer the discharge. The use of increasing larger diameters will help to prevent the final crop receiving region from becoming clogged from the inflow of crops and the transfer of crops from the other crop receiving regions.

The carousel merger device may have at least one of the support plates and corresponding rotating blades rotating at a different speed than the other support plates. By adjusting the speed of the support plate closest to the discharge, the velocity and the density of the material can be controlled. This adjustability allows the remaining discs to operate at a slower speed, thereby reducing the wear on these parts.

The carousel merger device of the present invention allows for the replacement of the traditional belt conveyor merger devices. The carousel merger device is more robust and reliable, thereby minimizing the repair and replacement or parts required when using the traditional belt conveyor merger devices. As the carousel merger device has been configured to fit within the same envelope as the traditional belt conveyor merger devices, the carousel merger device can be incorporated into existing designs of agricultural equipment without the cost of redesign.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any references herein to the term "left" or "right" are used as a matter of mere convenience, and are determined by standing at the rear of the machine facing in a normal direction of travel. Furthermore, the various components shown or described herein for any specific application of this invention can be varied or altered as anticipated by this invention and the practice of a specific application of any element may be already widely known or used in the art by persons skilled in the art and each will likewise not therefore be discussed in significant detail.

Figure 1:
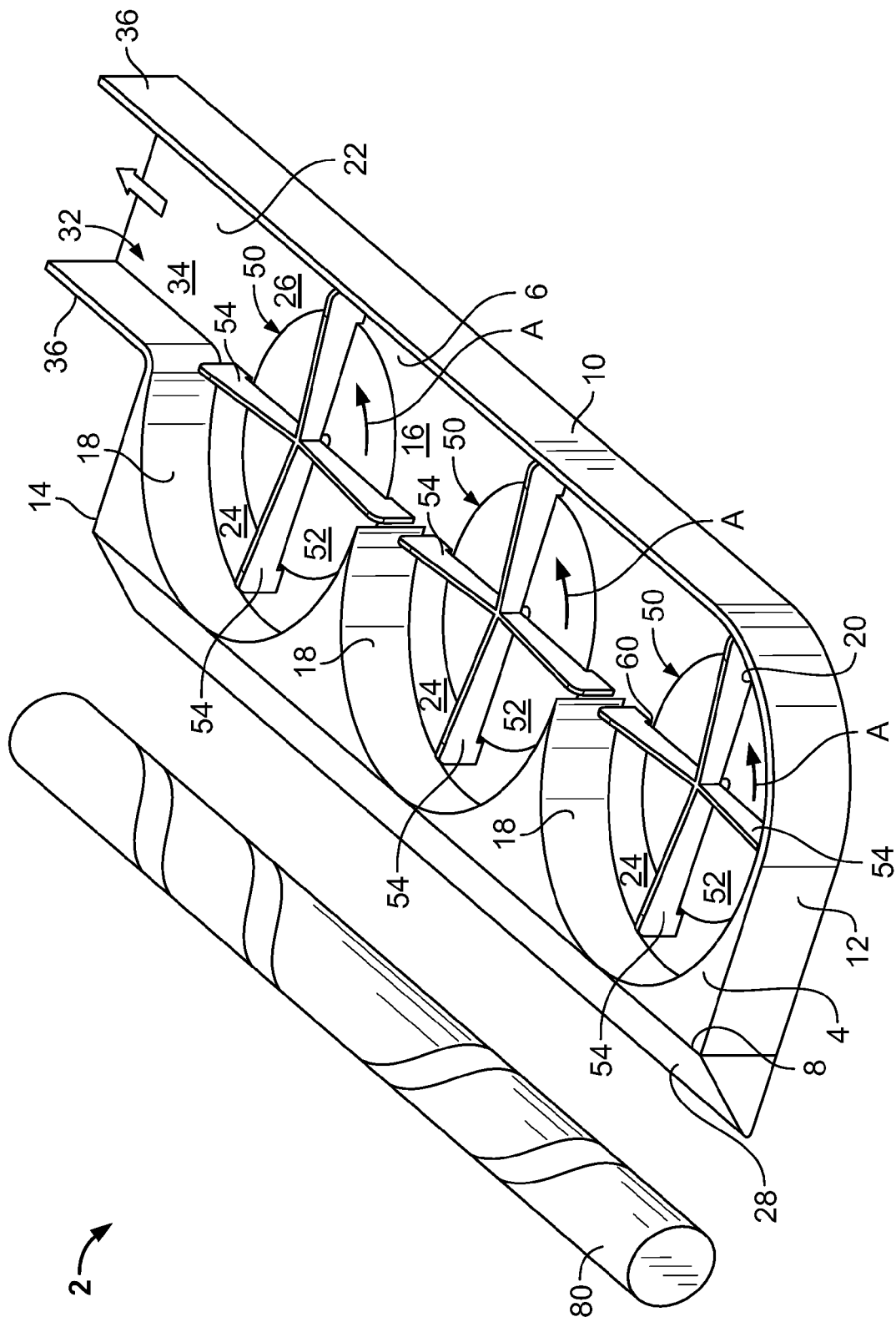
FIG. 1 is a top perspective view of an embodiment of a carousel merger device according to the present invention.

Referring to FIG. 1, the carousel merger device 2 has a top surface 4 and an oppositely facing bottom wall 6. A front wall 8 and back wall 10 extend between the top surface 4 and the bottom wall 6. End walls 12, 14 extend between the top surface 4 and the bottom wall 6 and are essentially perpendicular to the front wall 8 and back wall 10. However, other non-perpendicular constructions may also be used.

A crop receiving passageway 16 extends through the top surface 4 to the bottom wall 6. The passageway 16 is defined by arcuate peripheral sidewalls 18, an arcuate end wall 20, the back wall 10, the bottom wall 6 and a discharge opening 22. The arcuate peripheral sidewalls 18 and the arcuate end wall 20 extend between the top surface 4 and the bottom wall 6 and are essentially perpendicular thereto. However, other non-perpendicular constructions may also be used. The discharge opening 22 extends through the end wall 14 opposite arcuate end wall 20. Each arcuate peripheral sidewall 18 forms a generally circular crop receiving region 24, with each arcuate peripheral sidewall 18 extending approximately 180 degrees around the respective crop receiving region 24. As is shown in the embodiment of FIG. 1, the arcuate peripheral sidewalls 18 form three distinct crop receiving regions 24. Depending on the application in which the carousel merger device 2 is used, the number of crop receiving regions can range from one to as many as needed to facilitate the movement of the crop.

A crop flow region 26 of the passageway 16 extends from the arcuate end wall 20 through portions of the crop receiving regions 24 to the discharge opening 22. In the embodiment shown, the width of the crop flow region 26, as defined as the distance between the back wall 10 and the ends of the arcuate peripheral sidewalls 18, is approximately equal to one half the diameter of the crop receiving regions 24. However, the width of the crop flow region can vary significantly depending upon the desired operating parameters of the carousel merger device. (Inventor to provide range)

A crop guide shield 28 extends from the front wall 8. The crop guide shield 28, as viewed in FIG. 2 has a generally triangular configuration. A back shield 30 (FIG. 2) extends from the back wall 10 beyond top surface 4 in a direction away from bottom surface 6 and essentially parallel to back wall 10. A discharge or discharge chute 32 (FIG. 1) extends from the discharge opening 22 in a direction away from end wall 12. The discharge chute 32 has a bottom wall 34 and sidewalls 36 which extend the required distance to deposit discharged crops from the carousel merger device.

Discs 50 are positioned in each crop receiving region 24. Although three discs are provided in the embodiment shown in FIG. 1, each of the discs is identical to the others, therefore, for ease of explanation and understanding, a detailed description of a single disc will provided. Disc 50 is mounted on a shaft (not shown) that extends through an opening (not shown) in the bottom wall 6 of the carousel merger device 2. The opening is dimensioned to precisely receive the shaft therethrough, as lateral movement of the disc relative to the bottom surface 6 should be minimized. A seal can be placed between the opening and the shaft to better secure the shaft and to prevent debris from migrating through the opening in the bottom wall 6. The disc 50 has a support plate 52 with radially extending paddles or blades 54 circumferentially spaced around the periphery of the support plate 52. The support plate is of a circular shape, although many shapes may be used. The diameter of the support plate 52 may vary according to the application, however, it is generally beneficial to have the diameter of the support plate approach, but be less than, the diameter of the crop receiving region 24.

As shown in FIG. 1, four blades 54 are mounted on the support plate 52 and are secured thereto by fastening members (not shown). The blades 54 extend into the crop receiving regions 24 in a direction that is essentially perpendicular to the bottom wall 6. The blades 54 extend radially and have upwardly extending flanges 58 along the trailing edge and downwardly extending flanges 60 along the leading edges. The blades 54 extend radially outwardly toward a respective peripheral sidewall 18. Free ends of the blades 54 are spaced from the respective peripheral sidewall 18 to prevent the binding of the blades when the crop material is introduced into the passageway 16. The flanges 60 of the blades 54 extend proximate to, but spaced from the bottom surface 8.

Figure 3:
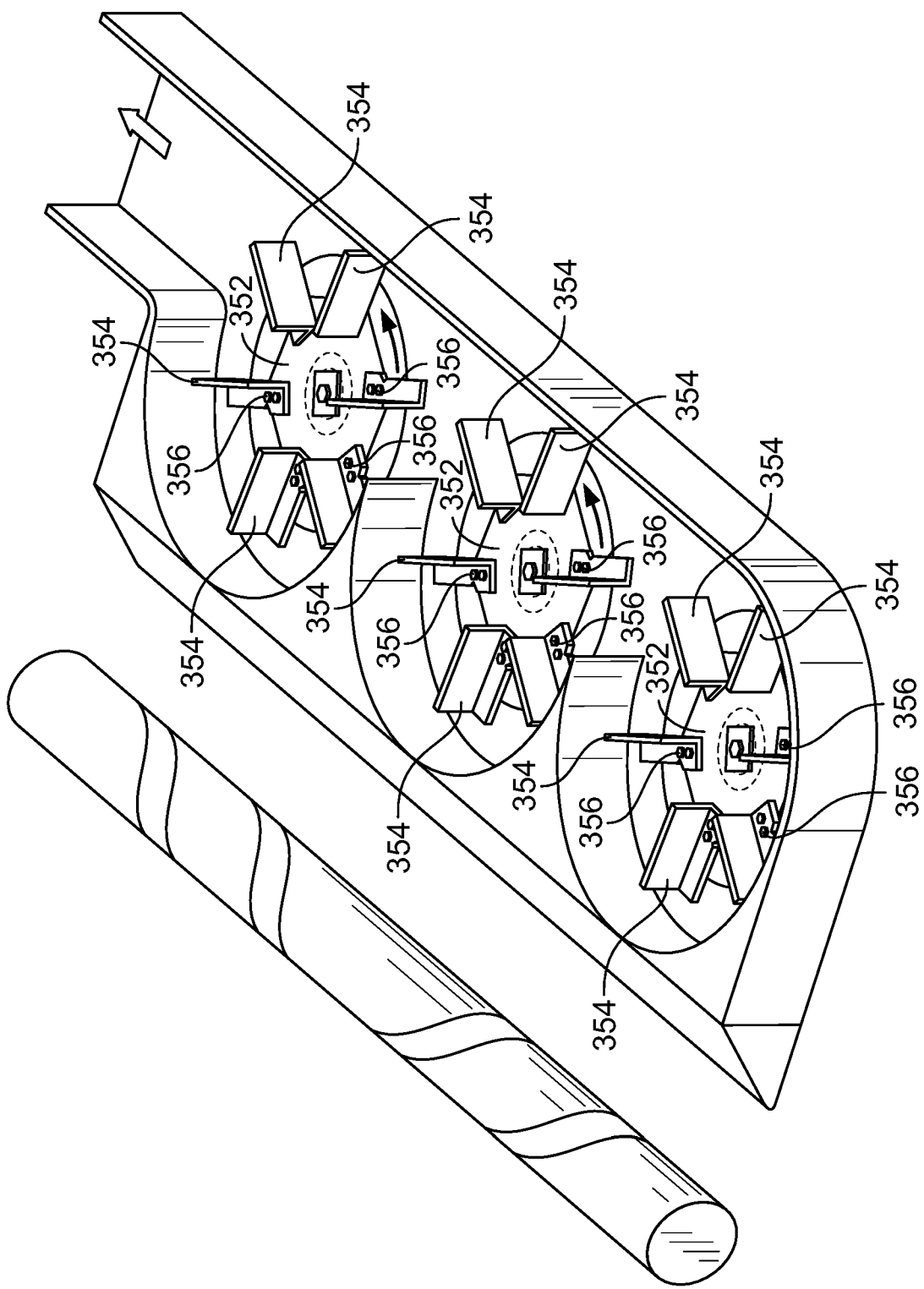
FIG. 3 is a top view of an alternate embodiment of a support plate and blades for use with the carousel merger device.

Referring to FIG. 3, an alternate configuration of the support plate 352 and blades 354 is shown. In this embodiment, six blades 354 are, respectively, mounted at six corners of the support plate 352 and are secured thereto by fastening members 356. The inner ends of the blades 354 are diametrically spaced from the center of the support plate to provide an area on the upper surface of the plate 352 that is clear to allow certain crops to be moved in a more efficient manner.

The shape and number of blades and the shape of the support plate can very depending on many factors, including the material to be moved, the volume to be moved, the speed, etc. The blades may also be tapered such that height of the blades increases as the blades approach the peripheral sidewalls. The size and shape of the blades can be altered to maximize the efficiency of the carousel merger device. The discs 50, and the components therefor, are configured and attached in a similar manner to that described in U.S. Pat. No. 3,594,047, which is hereby incorporated by reference in its entirety.

The discs 50 are driven by means of a serpentine belt 62 (FIG. 2) and pulley drive. In the manner known in the industry, a control mechanism directs the belt and pulley drive to allow the various discs 50 to operate at the same or different speeds depending on the application. In the alternative, each disc 50 may be driven by an independent belt that would also be controlled by a control mechanism to optimize the performance of the carousel merger device 2. Other known types of drive mechanisms could be used without departing from the scope of the invention.

Figure 2:
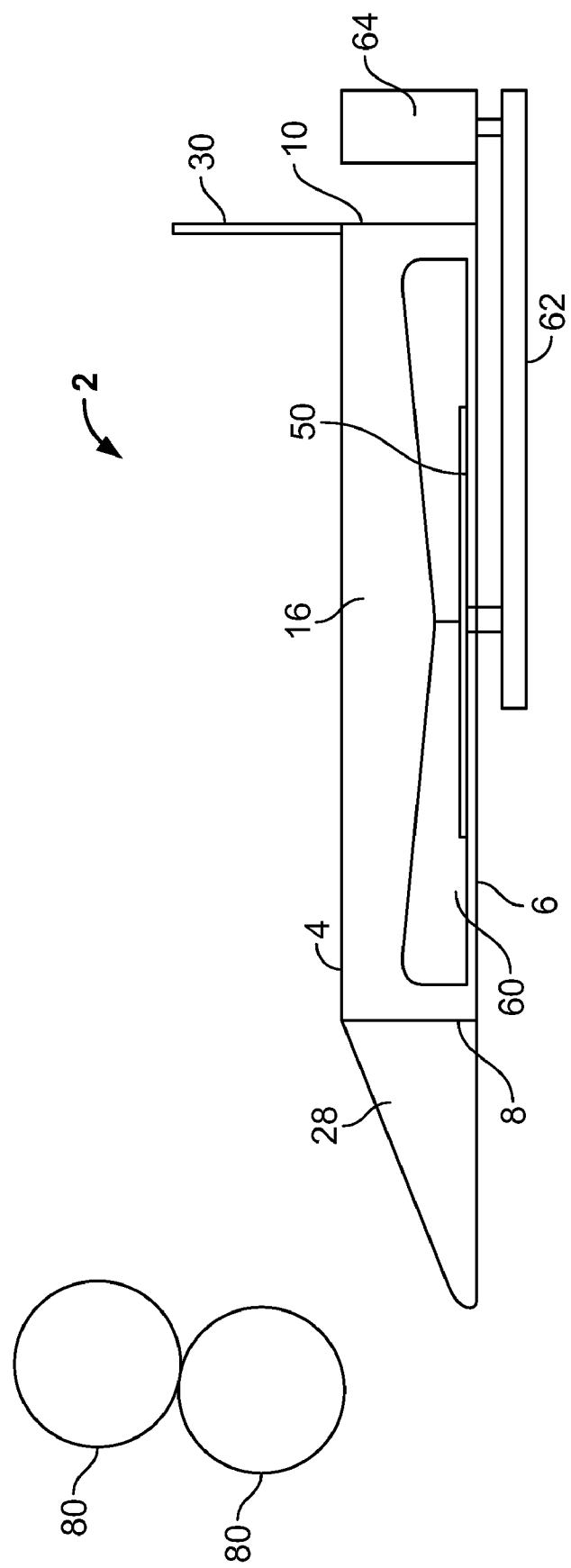
FIG. 2 is a side view of the carousel merger device shown in relation to the ground.

In operation, crops that have been cut or otherwise worked are delivered to the carousel merger device 2. The crops may be delivered in any number of ways, whether by means of pick-up tines, conditioning rolls 80 or other known methods. Depending on the apparatus in which the carousel merger device 2 is integrated, the carousel merger device 2 may be positioned in a plane that is approximately forty-five degrees to the surface of the ground, thirty degrees to the surface of the ground (as shown in FIG. 2) in a plane that is essentially parallel to the ground, or in any other appropriate position. The appropriate angle is determined by the type of material, flow of material, and other factors similar to those considered when determining the angle to deploy a conventional belt driven merger.

In operation, the crop is delivered to the carousel merger device 2 through the top surface 4. As the crop is delivered, it enters the crop receiving passageway 16. As the delivery of the crop is not precisely controlled, some of the crop may fall short of the passageway 16, while other of the crop may overshoot the passageway. For crops that fall short, the crop guide shield 28 is configured to help guide the crop to the passageway 16. For crop that overshoots the passageway 16, the crop will contact the back shield 30, causing the crop to fall into the passageway 16.

With the crop properly directed, the crop enters the passageway 16. Prior to the crop entering the passageway 16, the discs 50 have already been engaged and powered by the belt 62 and hydraulic motor 64, causing the support plates 52 and blades 54 to rotate in the direction indicated by arrow A in FIG. 1.

Consequently, as the crop enters the passageway 16, the crop comes into contact with the rotating support plates 52 and rotating blades 54 in the crop receiving region 24. As this contact occurs, the rotating action of the support plates 52 and blades 54 moves the crop toward the arcuate peripheral sidewall 18. The continued motion and the effects of centrifugal force on the crops cause the crops continue to move toward the peripheral sidewalls 18. As the support plates 52 span much of the crop receiving region 24, the crops can be more easily moved toward the peripheral sidewalls 18 as the moving support plates 52 lessens the friction the crops encounter if they where moving against the stationary bottom wall 6. In the crop receiving region 24 nearest end wall 12, the crops continue to move along the peripheral sidewall 18 to the arcuate end wall 20. As the radius of the arcuate end wall 20 is essentially the same as the radius of the arcuate peripheral sidewall 18, the crop continues to be moved along the end wall 20 by the blades 54. As the crops pass the end wall 20, the effects of the centrifugal force causes the crop to be maintained adjacent the back wall 10. Consequently, as the blades 54 continue to rotate, the crop is forced to move along the back wall 10 into the crop flow region 26 toward the discharge chute 32. Any crop material that does not proceed along this path is returned by the blades 54 to the crop receiving region 24 to repeat the process.

In the remaining two crop receiving regions 24, the crops are moved along the peripheral sidewall 18 as described above. However, when the crops reach the end of the arcuate peripheral sidewall 18, the crops enter crop flow region 26. As the crops pass the peripheral sidewall 18, the effects of the centrifugal force causes the crop to be moved toward the back wall 10. However, the continued rotation of the blades 54 causes the crops to also move in a direction toward the discharge chute 32. This motion toward the discharge chute 32 is also enhanced by the flow of crop material coming from the crop receiving region nearest the end wall 12. Consequently, as the blades 54 continue to rotate and as the additional crop flow is moving toward the discharge chute 32, the majority of the crop is forced to move along the back wall 10 of the crop flow region 26 toward the discharge chute 32. Any crop material that does not proceed along this path is returned by the blades 54 to any of the respective crop receiving regions 24 to repeat the process.

The crops continue along the crop flow region 26 and are ultimately directed through the discharge opening 22 to the discharge chute 32. The crops exit the discharge chute 32 and are placed on the ground in windrows for further processing. The width and height of the windrow can be varied by varying the speed of rotation of the blades 54. The faster the blades 54 are rotated, the more energy is imparted to the crop, causing the crop to discharge from the discharge chute 32 at a greater velocity.

Variations of the carousel merger device can be made without departing from the scope of the invention. The crop receiving regions 24 may not have a consistent radius. The radius may increase slightly in the direction of movement of the crops. In some instances, this increase in radius may prevent the crops from binding as they are moved along the arcuate sidewalls 18.

As previously discussed, the individual discs 50 and their respective support plates 52 and respective blades 54 can be operated at different rotational speeds. This can be accomplished through a single belt and pulley system or with individual belt drives for each disc or combination shaft direct drive and belt and pulley drive system or other suitable drive systems. For example, by controlling or adjusting the rotational speed of the disc closest to the discharge chute, the velocity and the density of the discharge material can be controlled. In certain instances, this allows the remaining discs to operate at a slower rotational speed, thereby reducing the wear on these parts.

Figure 4:
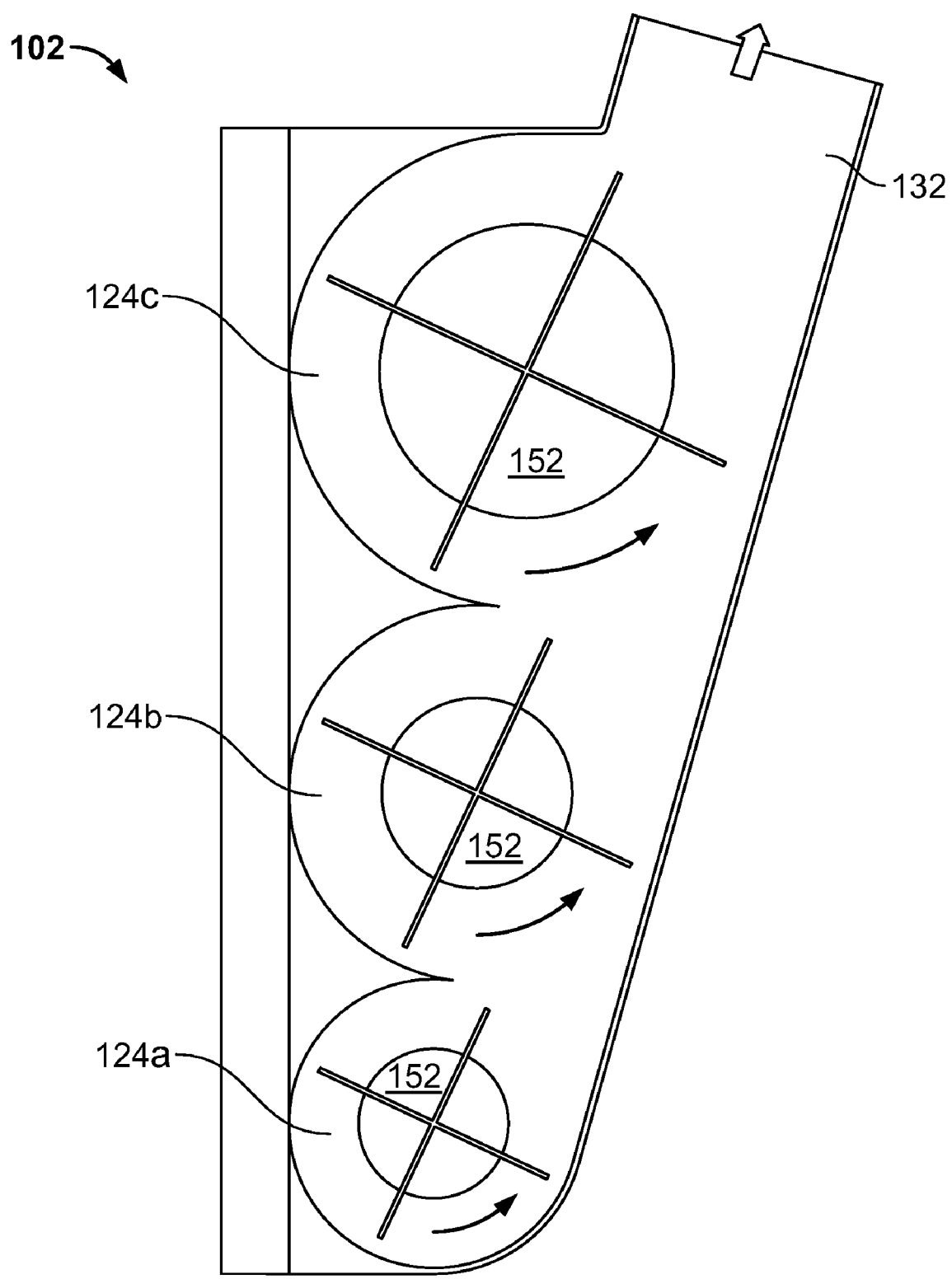
FIG. 4 is a top view of an alternate embodiment of the carousel merger device with crop receiving regions having increasing diameters.

Also, as shown in FIG. 4, the size of the crop receiving regions and the corresponding size of the discs can vary across the carousel merger device 102. As further shown in FIG. 4, the crop receiving regions 124a, 124b, 124c and the corresponding support plates 152 positioned therein have increasingly larger diameters as they are disposed at correspondingly decreasing distances from the discharge chute 132. One example of where this arrangement could prove beneficial is in applications in which a large amount of crop must be moved. The use of increasingly larger diameters will help to prevent the final crop receiving region 124c from becoming clogged from the inflow of crops from the conditioner, etc. and the transfer of crops from the other crop receiving regions 124a, 124b. The use of variable speeds for each of the discs could also be beneficial in this embodiment.

Figure 5:
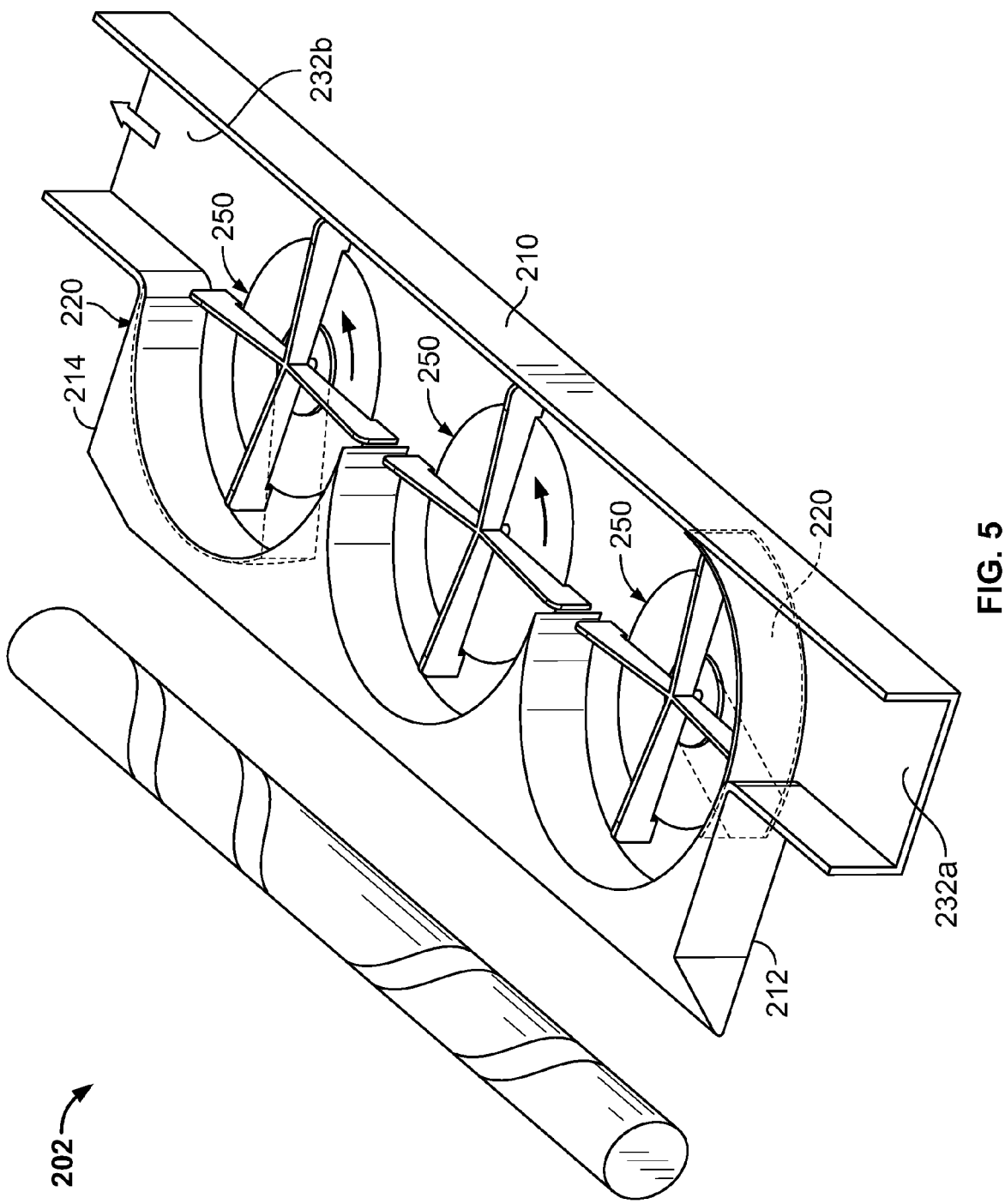
FIG. 5 is a top perspective view of another alternate embodiment of the carousel merger device having a removable end wall.

FIG. 5 illustrates another embodiment of the invention. Carousel merger device 202 is similar to carousel merger 2 in many respects. However, carousel merger has a discharge chute 232a, 232b provided on either end wall 212, 214. A pivotable arcuate end wall 220 can be positioned in either discharge chute 232a or 232b. The pivotable arcuate end wall 220 can be moved between an open position and a closed position. In FIG. 5, the pivotable arcuate end wall 220 proximate the discharge chute 232b is in the open position. In this position, pivotable arcuate end wall 220 is provided adjacent the arcuate peripheral sidewall. As the pivotable arcuate end wall 220 has essentially the same configuration of the arcuate peripheral sidewall, the positioning of the pivotable arcuate end wall 220 in the open position does not disturb the movement of material placed in the crop receiving region. In the closed position, as shown proximate discharge chute 232a, the pivotable arcuate end wall 220 is moved into the crop flow region to block the respective discharge chute. The pivotable arcuate end wall 220 is attached to the drive means by a thin arm shown in dotted lines in FIG. 5. The drive means engages the thin arm as required to move the pivotable arcuate end wall 220 between the open and closed positions.

When the pivotable arcuate end wall 220 closes discharge chute 232a, discs 250 are rotated in the same direction as discs 50 of carousel merger device 2. In all other aspects, in this configuration carousel merger device 202 is essentially equivalent to carousel merger device 2.

When the pivotable arcuate end wall 220 closes discharge chute 232b, discs 250 may be rotated in the opposite direction as discs 50 of carousel merger device 2. This would enable the carousel merger device 202 to deposit the crops from the left of the device rather than the right. Except for depositing the crop on a different side in this configuration, carousel merger device 202 is essentially equivalent to carousel merger device 2.

In applications in which the crops are to be deposited on both sides of the carousel merger device, both pivotable arcuate end walls 220 are moved to the open position, leaving both discharge chutes 232a, 232b open. In this configuration, discs 250 nearest discharge chute 232b would be rotated in the direction shown in FIG. 1 and discs nearest discharge chute 232a would be rotated in the opposite direction thereby the carousel merger device 202 to deposit the crops from both sides of the device.

The carousel merger device of the present invention allows for the replacement of the traditional belt conveyor merger devices. The carousel merger device is more robust and reliable, thereby minimizing the repair and replacement or parts required when using the traditional belt conveyor merger devices. As the carousel merger device has been configured to fit within the same envelope as the traditional belt conveyor merger devices, the carousel merger device can be incorporated into existing designs of agricultural equipment without the cost of redesign.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A carousel merger device to merge crops comprising:
    a crop receiving passageway extending through a top surface toward a bottom surface of the carousel merger device, the crop receiving passageway having a plurality of crop receiving regions and a crop flow region;
    the crop receiving regions have arcuate sidewalls, support plates rotatably mounted to the bottom surface and blades mounted to the support plates;
    the crop flow region is provided adjacent the crop receiving regions with a portion of the crop flow region extending through the crop receiving regions, the crop flow region having a back wall opposite from the arcuate sidewalls of the crop receiving regions;
    a discharge in communication with the crop flow region;
    whereby as crops are moved into the crop receiving regions, the crops make contact with the support plates and blades which are rotating causing the crops to be moved by the support plates, blades and the centrifugal force generated thereby toward the arcuate sidewalls, such that the continued movement of the crops causes the crops to move into and through the crop flow region to the discharge.

2. The carousel merger device as recited in claim 1 wherein an arcuate end wall is provided in the crop flow region at an end of the crop flow region opposite the discharge, the arcuate end wall extending between a respective arcuate sidewall and the back wall, the arcuate end wall having essentially the same radius as the respective arcuate sidewall.

3. The carousel merger device as recited in claim 2 wherein the arcuate end wall is movable between and open position and a closed position.

4. The carousel merger device as recited in claim 3 wherein a second discharge is provided at the end of the crop flow region opposite the first discharge.

5. The carousel merger device as recited in claim 4 wherein the direction of rotation of the rotating support plates and blades can be reversed to allow the crops to be discharged from the opposite side of the carousel merger device.

6. The carousel merger device as recited in claim 1 wherein inner ends of the blades are diametrically spaced to provide substantial area on upper surfaces of the support plates that does not have blades projecting therefrom.

7. The carousel merger device as recited in claim 1 wherein the blades extend from the center of the support plate generally radially outwardly toward the arcuate sidewalls.

8. The carousel merger device as recited in claim 1 wherein each of the crop receiving regions have progressively larger diameters as the respective crop receiving regions are positioned nearer the discharge.

9. The carousel merger device as recited in claim 1 wherein at least one of the support plates and corresponding rotating blades rotates at a different speed than the other support plates.

* * * * *